United States Patent
Blunn

(10) Patent No.: US 9,694,343 B2
(45) Date of Patent: Jul. 4, 2017

(54) CELLULOSE PHOSPHATE POWDER PRODUCT AND PROCESS FOR MANUFACTURE THEREOF, AND APPLICATION TO REMOVAL OF CONTAMINANTS FROM AQUEOUS SOLUTIONS

(75) Inventor: Adam Justin Blunn, Newbys Hill (AU)

(73) Assignee: AUSTRALIAN BIOREFINING PTY LTD, New South Wales (AU)

( * ) Notice: Subject to any disclaimer, the term of this patent is extended or adjusted under 35 U.S.C. 154(b) by 0 days.

(21) Appl. No.: 13/983,225

(22) PCT Filed: Feb. 1, 2012

(86) PCT No.: PCT/AU2012/000083
§ 371 (c)(1),
(2), (4) Date: Nov. 27, 2013

(87) PCT Pub. No.: WO2012/103582
PCT Pub. Date: Aug. 9, 2012

(65) Prior Publication Data
US 2014/0073775 A1    Mar. 13, 2014

(30) Foreign Application Priority Data
Feb. 1, 2011   (AU) ................................ 2011900307

(51) Int. Cl.
| | | |
|---|---|---|
| C08B 5/00 | (2006.01) |
| B01J 20/24 | (2006.01) |
| C08H 8/00 | (2010.01) |
| C08L 1/16 | (2006.01) |
| C08J 3/14 | (2006.01) |
| C02F 1/28 | (2006.01) |
| B01J 20/30 | (2006.01) |
| C02F 101/10 | (2006.01) |
| C02F 101/20 | (2006.01) |
| C02F 101/22 | (2006.01) |

(52) U.S. Cl.
CPC ........... *B01J 20/24* (2013.01); *B01J 20/3085* (2013.01); *C02F 1/286* (2013.01); *C08B 5/00* (2013.01); *C08H 8/00* (2013.01); *C08J 3/14* (2013.01); *C08L 1/16* (2013.01); *B01J 2220/4825* (2013.01); *B01J 2220/4831* (2013.01); *C02F 2101/103* (2013.01); *C02F 2101/106* (2013.01); *C02F 2101/20* (2013.01); *C02F 2101/206* (2013.01); *C02F 2101/22* (2013.01); *C08J 2301/16* (2013.01)

(58) Field of Classification Search
CPC ....................................................... B01J 20/24
See application file for complete search history.

(56) References Cited

U.S. PATENT DOCUMENTS

| | | | | |
|---|---|---|---|---|
| 2,759,924 A | * | 8/1956 | Touey | ........................ C08B 5/00 536/62 |
| 6,027,536 A | * | 2/2000 | Westerink | ............... C08B 1/003 162/157.6 |
| 6,579,977 B1 | | 6/2003 | Pieschel et al. | |
| 2005/0175758 A1 | | 8/2005 | Korber et al. | |
| 2007/0093654 A1 | * | 4/2007 | Yabusaki | ........................ 536/62 |
| 2010/0252509 A1 | | 10/2010 | Kipers | |

FOREIGN PATENT DOCUMENTS

| | | |
|---|---|---|
| AU | 2010295857 | 3/2012 |
| CN | 101508426 | 8/2009 |
| CZ | 9700211 | 10/1997 |
| GB | 899284 | 6/1962 |
| GB | 1445754 | 8/1976 |
| GR | 1006922 | 7/2010 |
| JP | 2002-192186 | 7/2002 |
| MX | 2008012759 | 5/2010 |
| RU | 2291113 | 1/2007 |
| RU | 2334802 | 9/2008 |
| TW | 200938494 | 9/2009 |

OTHER PUBLICATIONS

International Search Report for PCT/AU2012/000083 mailed May 18, 2012.
Written Opinion of the International Searching Authority mailed May 18, 2012.
International Preliminary Report on Patentability dated Dec. 20, 2012.

* cited by examiner

*Primary Examiner* — Eric Olson
(74) *Attorney, Agent, or Firm* — Nixon & Vanderhye P.C.

(57) ABSTRACT

A process for producing a cellulose based sorbent material for the removal of water soluble contaminants from water and other aqueous solutions comprising reacting one or more biomass based cellulose containing raw materials with dilute phosphoric acid where the reaction mixture containing said cellulose containing materials is heated to a reaction temperature and after completion of the reaction time, separation of the dilute phosphoric acid solution from the remaining insoluble raw material, neutralization of the solution by means of a suitable neutralizing agent resulting in precipitation of the modified cellulose, and then separating, washing and removing excess water from the resultant precipitate.

22 Claims, No Drawings

CELLULOSE PHOSPHATE POWDER PRODUCT AND PROCESS FOR MANUFACTURE THEREOF, AND APPLICATION TO REMOVAL OF CONTAMINANTS FROM AQUEOUS SOLUTIONS

This application is the U.S. national phase of International Application No. PCT/AU2012/000083 filed 1 Feb. 2012 which designated the U.S. and claims priority to AU 2011900307 filed 1 Feb. 2011, the entire contents of each of which are hereby incorporated by reference.

FIELD OF THE INVENTION

This invention relates to a chemical process for synthesising a modified cellulose phosphate powder from biomass sources of cellulose including, but not limited to, algae, bagasse, and waste paper.

This invention further relates to the application of the cellulose phosphate powder for use in removal of venous contaminants or chemical species from water, including but not limited to Mercury, Cadmium, Chromium, Copper, Zinc, Iron, Bismuth, Selenium, Tin, Cobalt, Nickel, Vanadium, Manganese, Uranium, Thorium, Arsenic, Lead and Ammonia.

BACKGROUND OF THE INVENTION

This invention has particular application in near neutral pH aqueous solutions that are contaminated with various water soluble species. Typical species include those containing transition metals, and also other contaminants containing ammonia, arsenic, and selenium. At low concentrations these contaminants are soluble in water and often have toxicological, clinical or environmental impacts. At low concentrations, many contaminants are difficult to separate from water. The existing solutions for removal of trace level contaminants, particularly those utilized in industrial applications, include the use of on exchange resins, activated carbon or alumina, or titanium dioxide, reverse osmosis, chemical precipitation, or biological filtration. Each of these works with only specific contaminants. However none of these options is satisfactory for all contaminants. Further, other limitations of these processes include insufficient removal of particular contaminants, impractical application for large volumes, and high expense. Often a combination of two or more techniques is necessary, and creates process engineering difficulties.

SUMMARY OF THE INVENTION

The present invention involves creating a modified cellulose based powder by reacting a biomass based cellulosic raw material with dilute phosphoric acid at elevated temperature. The cellulosic raw material is partially dissolved and then the remaining insoluble raw material is separated from the dilute phosphoric add solution. The clear phosphoric acid solution is then neutralized with subsequent precipitation of the modified cellulose, followed by, separating, washing and removal of excess water prior to use. The resulting product is a sorbent powder. (Wherever the term "sorbent" is used in this specification, this shall be interpreted to mean adsorbent. However, it is to be understood that the product may also have absorbent properties.) The sorbent product, which may be in the form of a powder or a slurry, is particularly useful for removal of low levels of contaminants from water and aqueous solutions. The solid residue resulting from extraction is then inert and non flammable, and the remaining filtrate is discarded, or may be processed for recovery of unreacted phosphoric acid.

As a sorbent for trace contaminants, the method of application includes but is not limited to contacting the sorbent product with the contaminated water or aqueous solution by musing and then separating either by allowing the product to settle and decanting the supernatant treated water or solution, or by filtering, or some other method of solid liquid separation.

Additionally the sorbent product can be used as an active component in a filter or permeable reactive barrier

DETAILED DESCRIPTION OF THE PREFERRED EMBODIMENTS

The synthesis of the sorbent powder is performed by utilizing a cellulosic feedstock. This may include but is not limited to algae, bagasse, and favourably, waste paper. The cellulosic feedstock is then mixed with dilute phosphoric acid (typically in the concentration range from approximately 2 g/l up to 40 g/l but may also be in the range 1 g/l up to 80 g/l), and heated to reaction temperature for at least 2 minutes, but more preferably at least 5 minutes, up to 4 hours. The heating may be performed by conventional means, but may also include alternative heating technologies for water including microwave heating. The ratio of cellulosic feedstock to dilute phosphoric add may typically be between a ratio of 1 part feedstock to 5 parts dilute phosphoric acid, up to 1 part feedstock to 40 parts of dilute phosphoric acid. However, this ratio may also foreseeably be in the range of 1 part feedstock to 2 parts dilute phosphoric acid, up to 1 part feedstock to 80 parts of dilute phosphoric add. This is more of a practical issue rather than a technical limit. The yield of sorbent from feedstock ranges from 4% by weight up to 40% by weight depending upon the feedstock used, the dilute acid concentration and volume, and the temperature and heating time of the synthesis.

Following reaction of the feedstock with dilute phosphoric acid, the remaining solids and the solution are separated by any suitable means. Simple filtering has been shown to be effective. The solid residue consists of insoluble and unreactive cellulosic feedstock. This residue is non flammable and, based upon this characteristic, may be useful as a fire retardant and in insulation products. Subsequent to the initial solid liquid separation, the filtrate or supernatant is neutralized to pH 7 with any suitable neutralizing agent but preferably caustic soda. As the neutralization is performed, a fine precipitate develops in solution which settles easily and filters easily. This precipitate is the object of the process and is recovered by filtering or other suitable solid liquid separation technique. The precipitate is then washed with water to remove any remaining salts, and excess water removed. Accordingly, the product may be a dried powder or may be in the form of a slurry.

The application of the sorbent product for treatment of low level water contaminants is performed by simple mixing of the sorbent product with water. Contact and mixing time may typically be between approximately 5 minutes and 2 hours. However, this range may be greater and foreseeably may be between approximately 2 minutes and 24 hours, with dose rate determined by total load of contaminants and capacity of the sorbent for a given contaminant. Following mixing of the sorbent and the water to be treated, solid liquid separation is performed by any suitable means including but not limited to filtering, centrifugation, and decanting. Additionally the sorbent can be utilized as a filter bed with the contaminated water passed through the filter bed with removal of various contaminants taking place within the filter bed.

The use of cellulose phosphate derivatives has been described in prior art patents DE19850286 (A1); DE19753196 (A1); DE19869746 (A1); U.S. Pat. No. 6,579, 977 (B1); U.S. Pat. No. 6,761,272 (B1); U.S. 2007093664 (A1); GB1001603 (A). In these patents all cellulose feedstocks described are prepared via several steps which include caustic pulping, further pulp preparation, and derivatisation with complex and expensive phosphate reagents. In the above prior art documents, derivatisation is performed in organic solvents which increase the safety risks and expense of producing a cellulose phosphate derivative. Further, additional derivatisation is needed to achieve satisfactory performance for trace contaminant removal and this usually includes but is not limited to addition of amine or nitrogen species to effect an improved functionality of the cellulose derivative.

The present invention provides an alternative and more cost effective solution for the removal of the abovementioned contaminants from water. The cellulose phosphate product has different physical characteristics and improved performance as water treatment product, particularly for trace contaminants. In addition, the cellulose phosphate of the present invention has a Fourier Transformation Infrared spectrum that shows significant differences from conventional cellulose phosphate esters and ethers. The process described in the present invention utilizes a different method of synthesis to previously taught approaches and offers a number of advantages including greater simplicity, lower risk and production costs. This results in a product with affinity for a range of contaminants (the affinity of which may vary according to the contaminant) without the need for further functionalization.

The following examples are provided in order to illustrate the process:

Example 1

3.128 g of waste paper was reacted with 120 mls of 8% w/v phosphoric acid at 104 degrees C. for 2 hours 43 minutes. The resultant mixture was cooled, separated by filtering and the residue washed and dried. 2.206 g of residue was recovered. The filtrate and washings were neutralized with 40 g/l caustic soda to a pH of 7.0, the resultant precipitated powder was filtered and washed and dried to give a final weight of 0.845 g of sorbent powder. 0.5 g of this powder was added to a 1 liter water sample with 24 hours mixing and the resultant change in composition was:

| Sample Analyte | Untreated Sample | Treated Sample |
| --- | --- | --- |
| ARSENIC (mg/L) | 0.130 | 0.078 |
| COPPER (mg/L) | 0.023 | 0.007 |
| IRON (mg/L) | 3.388 | 1.357 |
| LEAD (mg/L) | 0.159 | 0.001 |
| SELENIUM (mg/L) | 1.698 | 1.181 |
| ZINC (mg/L) | 0.042 | 0.023 |
| MERCURY (mg/L) | 0.009 | <0.001 |
| THALLIUM (mg/L) | 0.0019 | 0.0011 |

Example 2

2.003 g of bagasse was reacted with 100 mls of 8% w/v phosphoric acid at 100 degrees C. for 3 hours and 15 minutes. The resultant mixture was cooled separated by filtering and the residue washed and dried. 1.782 g of residue was recovered. The filtrate and washings were neutralized with 40 g/l caustic soda to a pH of 7.0, the resultant precipitated powder was filtered and washed and dried to give a final weight of 0.241 g of sorbent powder.

Example 3

1.030 g of dried filamentous algae was reacted with 100 mls of 8% w/v phosphoric acid at 100 degrees C. for 3 hours and 15 minutes. The resultant mixture was Cooled separated by filtering and the residue washed and dried. 0.982 g of residue was recovered. The filtrate and washings were neutralized with 40 g/l caustic soda to a pH of 7.0, the resultant precipitated powder was filtered and washed and dried to give a final weight of 0.073 g of sorbent powder.

Example 4

1170 g of waste paper was boiled with 23.3 liters of 4.4% w/v phosphoric acid for 2 hours. The resultant mixture was cooled separated by decanting end then filtering and the residue washed and dried. The filtrate and washings were neutralized with 80 g/l caustic soda to a pH of 6.5, the resultant precipitated powder was filtered and washed and dried to give a final weight of 221 g of sorbent powder. 339 mg of this powder was prepared as a column filter and 100 ml of contaminated water was passed through the filter. The resultant change in water composition was:

| Sample Analyte | Untreated Sample | Treated Sample |
| --- | --- | --- |
| IRON (ug/L) | 1620 | 5 |
| COPPER (ug/L) | 440 | 035 |
| MANGANESE (ug/L) | 3360 | 1480 |
| LEAD (ug/L) | 9 | <0.5 |

The invention enables the reduction of a range of trace contaminants from contaminated water sources with near neutral pH, without any toxic or aesthetic reduction in water quality. This invention has particular application in dilute waste water treatment, or environmental water treatment.

Accordingly the invention has both commercial and environmental advantages. It will of course be realised that while the foregoing has been given by way of illustrative example of this invention, all such and other modifications and variations thereto as would be apparent to persons skilled in the art are deemed to fall within the broad scope and ambit of this invention as is herein set forth.

The invention claimed is:

1. A process for producing a cellulose based sorbent material for the removal of water soluble contaminants from water and other aqueous solutions comprising reacting one or more biomass based cellulose containing raw materials with a solution consisting essentially of dilute phosphoric acid where the reaction mixture containing said cellulose containing materials is heated to a reaction temperature and after completion of the reaction time, separation of the dilute phosphoric acid solution from the remaining insoluble raw material, neutralisation of the solution by means of a suitable neutralising agent resulting in precipitation of the modified cellulose, and then separating, washing and removing excess water from the resultant precipitate.

2. A process for producing a cellulose based sorbent material comprising reacting one or more biomass based cellulose containing raw materials with a solution consisting essentially of dilute phosphoric acid where the reaction mixture containing said cellulose containing materials is heated to a reaction temperature and after completion of the reaction time, separation of the dilute phosphoric acid solution from the remaining insoluble raw material, neutralisation of the solution by means of a suitable neutralising agent resulting in precipitation of the modified cellulose, and then filtering, washing and drying the resultant precipitate.

3. A process for producing a cellulose based sorbent material in accordance with claim 1 in which the concentration of the phosphoric acid is in the range of approximately 1 g/l to 80 g/l.

4. A process for producing a cellulose based sorbent material in accordance with claim 1 in which the concentration of the phosphoric acid is in the range of approximately 2 g/l to 40 g/l.

5. A process for producing a cellulose based sorbent material in accordance with claim 1 wherein the reaction mixture is heated to reaction temperature for at least 2 minutes.

6. A process for producing a cellulose based sorbent material in accordance with claim 1 wherein the reaction mixture is heated to reaction temperature for at least 5 minutes.

7. A process for producing a cellulose based sorbent material in accordance with claim 1 wherein the reaction mixture is heated to reaction temperature for at least 1 hour.

8. A process for producing a cellulose based sorbent material in accordance with claim 1 wherein the reaction mixture is heated to reaction temperature for up to 4 hours.

9. A process for producing a cellulose based sorbent material in accordance with claim 1 in which the ratio of cellulosic feedstock to dilute phosphoric acid is in the range of 1 part feedstock to 5 parts dilute phosphoric acid up to 1 part feedstock to 40 parts of dilute phosphoric acid.

10. A process for producing a cellulose based sorbent material in accordance with claim 1 in which the ratio of cellulosic feedstock to dilute phosphoric acid is in the range of 1 part feedstock to 2 parts dilute phosphoric acid up to 1 part feedstock to 80 parts of dilute phosphoric acid.

11. A process for producing a cellulose based sorbent material in accordance with claim 1 wherein the neutralisation agent used to neutralize the solution is caustic soda.

12. A process for producing a cellulose based sorbent material in accordance with claim 1 wherein the solution is neutralized to approximately pH 7.

13. A process for producing a cellulose based sorbent material for the removal of water soluble contaminants from water and other aqueous solutions in accordance with claim 1 wherein at least one contaminant contains Mercury.

14. A process for producing a cellulose based sorbent material for the removal of water soluble contaminants from water and other aqueous solutions in accordance with claim 1 wherein at least one contaminant contains Cadmium.

15. A process for producing a cellulose based sorbent material for the removal of water soluble contaminants from water and other aqueous solutions in accordance with claim 1 wherein at least one contaminant contains Chromium.

16. A process for producing a cellulose based sorbent material for the removal of water soluble contaminants from water and other aqueous solutions in accordance with claim 1 wherein at least one contaminant contains Copper.

17. A process for producing a cellulose based sorbent material for the removal of water soluble contaminants from water and other aqueous solutions in accordance with claim 1 wherein at least one contaminant contains Zinc.

18. A process for producing a cellulose based sorbent material for the removal of water soluble contaminants from water and other aqueous solutions in accordance with claim 1 wherein at least one contaminant contains Iron.

19. A process for producing a cellulose based sorbent material for the removal of water soluble contaminants from water and other aqueous solutions in accordance with claim 1 wherein at least one contaminant contains Bismuth.

20. A cellulose based sorbent product manufactured in accordance with the process in claim 1 in which the product is in the form of a powder.

21. A process for producing a cellulose based sorbent material in accordance with claim 1
wherein:
the concentration of the phosphoric acid is in the range of approximately 1 g/l to 80 g/l;
the reaction mixture is heated to reaction temperature for 2 minutes to 4 hours;
the ratio of cellulosic feedstock to dilute phosphoric acid is in the range of 1 part feedstock to 2 parts dilute phosphoric acid up to 1 part feedstock to 80 parts of dilute phosphoric acid;
the neutralisation agent used to neutralize the solution is caustic soda;
the solution is neutralized to approximately pH 7; and
the product is in the form of a powder.

22. A process for producing a cellulose based sorbent material in accordance with claim 1
wherein:
in which the concentration of the phosphoric acid is in the range of approximately 2 g/l to 40 g/l;
the reaction mixture is heated to reaction temperature for 2 hours to 4 hours;
the ratio of cellulosic feedstock to dilute phosphoric acid is in the range of 1 part feedstock to 5 parts dilute phosphoric acid up to 1 part feedstock to 40 parts of dilute phosphoric acid;
the neutralisation agent used to neutralize the solution is caustic soda;
the solution is neutralized to approximately pH 7; and
the product is in the form of a powder.

* * * * *